United States Patent [19]
Ehemann, Jr. et al.

[11] Patent Number: 5,619,330
[45] Date of Patent: Apr. 8, 1997

[54] METHOD AND APPARATUS FOR DETERMINING THICKNESS OF AN OPC LAYER ON A CRT FACEPLATE PANEL

[75] Inventors: George M. Ehemann, Jr.; Edward R. Garrity, Jr., both of Lancaster; Robert A. Duschl, Lititz; Istvan Gorog, Lancaster, all of Pa.

[73] Assignee: Thomson Consumer Electronics, Inc., Indianapolis, Ind.

[21] Appl. No.: 577,313

[22] Filed: Dec. 22, 1995

[51] Int. Cl.⁶ .................................. G01B 11/06
[52] U.S. Cl. ..................... 356/382; 250/559.28
[58] Field of Search ........................ 356/381, 382; 250/559.27, 559.28

[56] References Cited

U.S. PATENT DOCUMENTS

| | | | |
|---|---|---|---|
| 3,017,512 | 1/1962 | Wolbert | 356/382 |
| 4,077,723 | 3/1978 | Pirlet. | |
| 4,120,590 | 10/1978 | Bieringer et al. . | |
| 4,129,781 | 12/1978 | Doyle | 250/341 |
| 4,670,779 | 6/1987 | Nagano | 358/75 |
| 5,396,080 | 3/1995 | Hannotiau et al. | 250/559.28 |
| 5,440,141 | 8/1995 | Horie | 250/559.27 |

FOREIGN PATENT DOCUMENTS 1303816  4/1987  U.S.S.R. ..................... 356/382

*Primary Examiner*—F. L. Evans
*Attorney, Agent, or Firm*—Joseph S. Tripoli; Dennis H. Irlbeck; Vincent J. Coughlin, Jr.

[57] ABSTRACT

The invention relates to a method for determining the thickness of an OPC layer 24 that is strongly absorptive to light at a first wavelength and substantially transmissive to light at a second wavelength. According to the method, the OPC layer is illuminated with light from an array 34 of fluorescent lamps 36 and the light transmitted through the layer is incident on a first filter 42 that is transmissive to light of the first wavelength. A first light intensity pattern transmitted through the first filter is sensed and stored in a first memory frame. Then OPC layer is illuminated again with light and the light transmitted through the layer is incident on a second filter 44 transmissive to light of the second wavelength. A second light intensity pattern transmitted through the second filter is sensed and stored in a second memory frame. The ratio of the first light intensity pattern and the second light intensity pattern is determined and utilized to calculate the thickness of the layer. An apparatus for practicing the method utilizes a CCD camera 38 as a light sensor which receives the filtered light. A computer 50 divides the first memory frame by the second memory frame to calculate the thickness of the OPC layer. A suitable display 52 provides a contour plot of the thickness of the OPC layer.

14 Claims, 5 Drawing Sheets

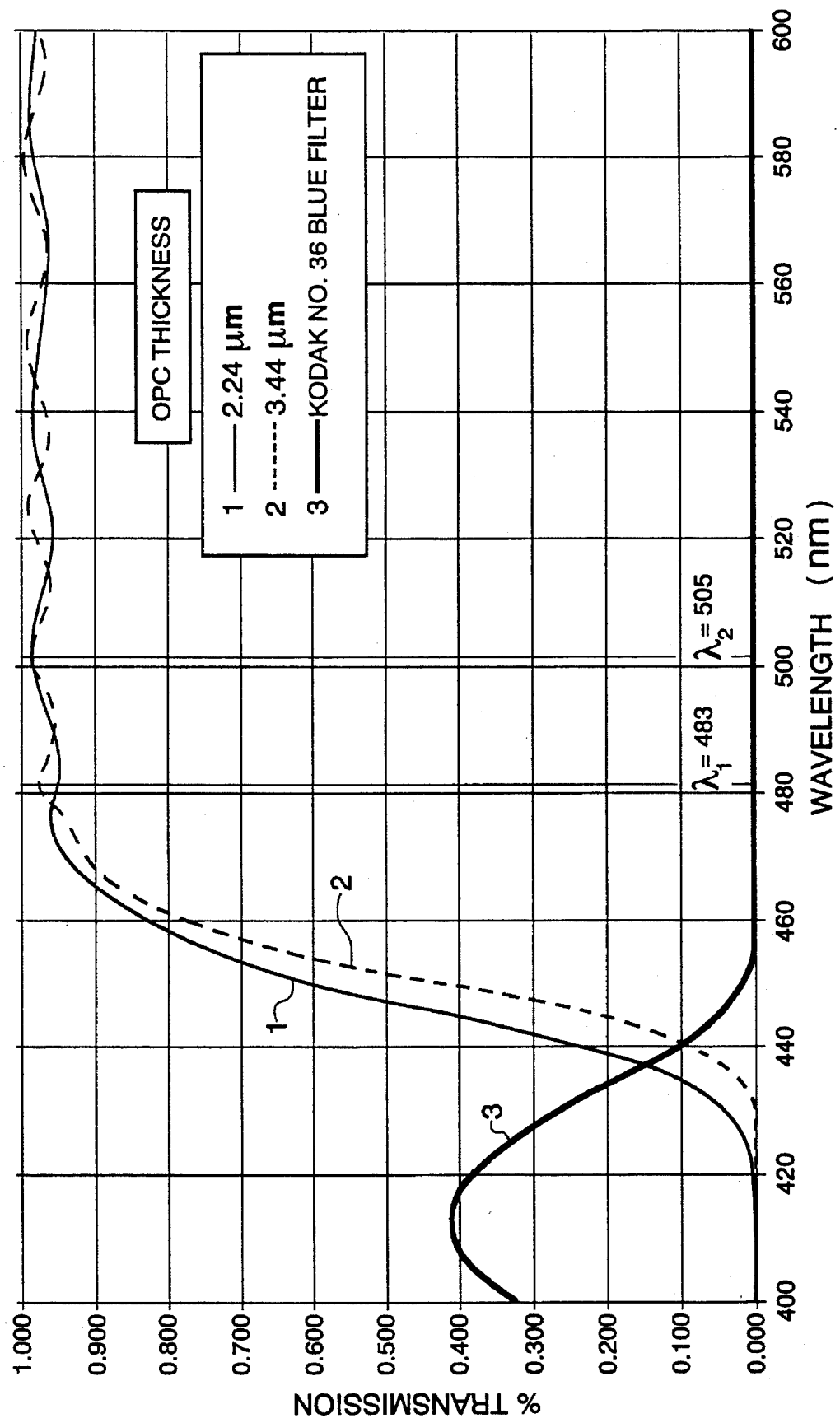

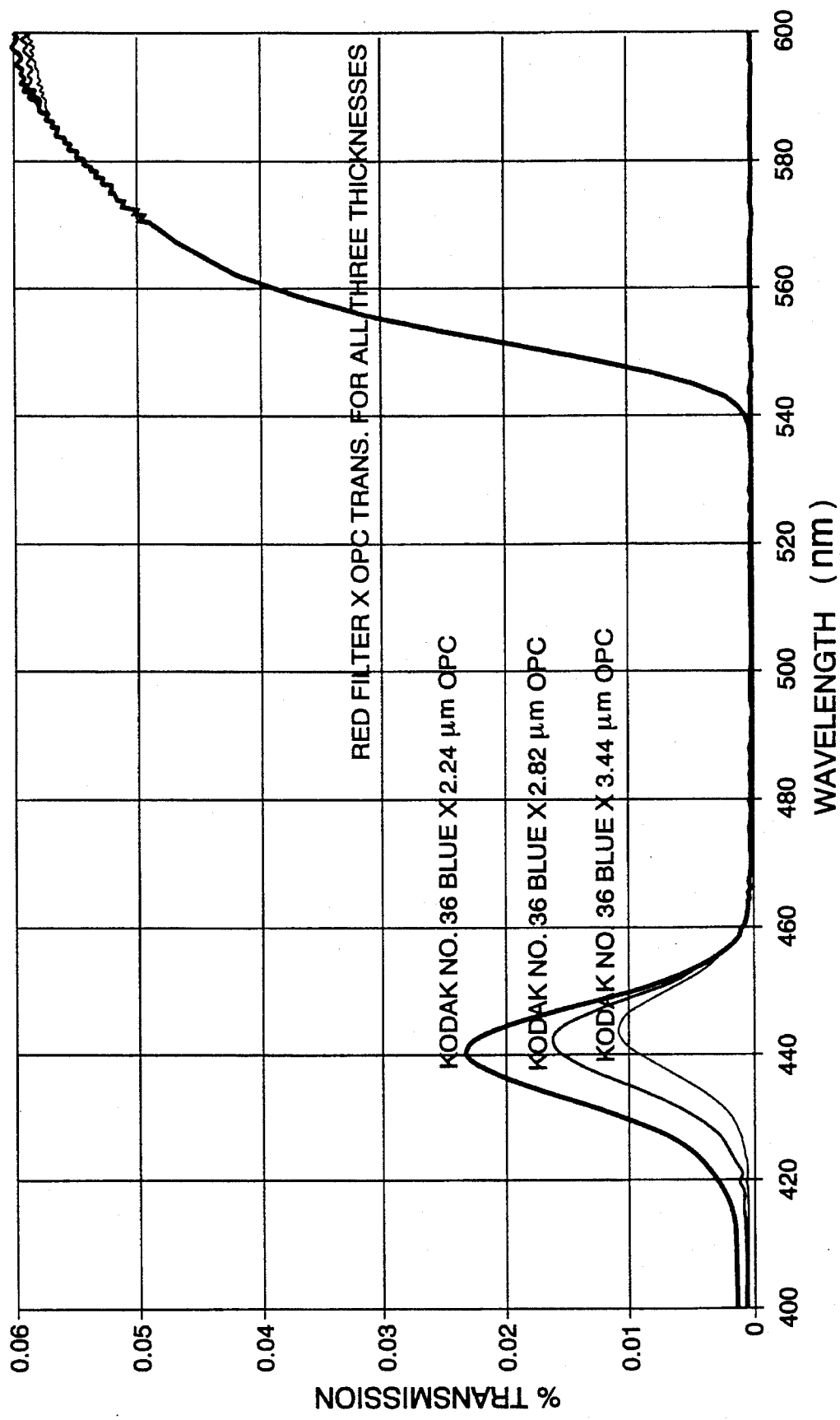
Fig. 4  BLUE AND RED FILTER TRANSMISSION RESPONSES VS. WAVELENGTH FOR THREE DIFFERENT OPC THICKNESSES

METHOD AND APPARATUS FOR DETERMINING THICKNESS OF AN OPC LAYER ON A CRT FACEPLATE PANEL

This invention relates to a method and apparatus for determining the thickness of an organic photoconductive (OPC) layer on the interior surface of a faceplate panel of a cathode-ray tube (CRT) and, more particularly, to a method and apparatus for non-destructively determining the thickness of the OPC layer, "on line," during the manufacturing of a luminescent screen by the electrophotographic screening (EPS) process.

BACKGROUND OF THE INVENTION

U.S. Pat. No. 4,921,767, issued to Datta et al., on May 1, 1990, describes the basic method of manufacturing a luminescent screen for a color CRT by the (EPS) process, using dry-powdered, triboelectrically-charged screen structure materials that are serially deposited onto a suitable photoreceptor disposed on an interior surface of a faceplate panel.

In the EPS process described in the above-referenced patent, dry-powdered, triboelectrically charged, color-emitting phosphors are deposited on a suitably prepared, electrostatically chargeable photoreceptor. The photoreceptor comprises an organic photoconductive (OPC) layer overlying, preferably, an organic conductive (OC) layer, both of which are deposited, serially, on an interior surface of a CRT faceplate panel. The OC layer of the photoreceptor has a thickness of about 1 micron (μm) and the overlying organic photoconductive (OPC) layer, preferably, has a thickness of about 5–6 μm. Initially, the OPC layer of the photoreceptor is electrostatically charged to a positive potential, using a suitable corona discharge apparatus. Then, selected areas of the OPC layer are exposed to visible light to discharge those areas, without affecting the charge on the unexposed areas. Next, a first triboelectrically positively charged phosphor is deposited, by reversal development, onto the discharged areas of the photoreceptor to form phosphor lines of substantially uniform width and screen weight. The OPC layer is electrostatically recharged, re-exposed to visible light, and developed with second and third phosphor materials to complete the luminescent screen. Then, the phosphor materials are fixed, filmed and aluminized, as is known in the art. Finally, the screen is baked at a high temperature to volatilize the organic constituents of the screen as well as the OC and the OPC layers.

The OPC layer may be deposited by spin-coating, air-spraying, or electrostatically-spraying a suitable OPC solution onto the interior surface of the faceplate panel. A drawback of spin-coating is that various spin cycle speeds and orientations are required to obtain a substantially uniform coating. Also, the typical coating time for faceplate panel having a 51 cm diagonal dimension is about 90 seconds, and about 90% of the applied material is wasted. This process time is unacceptably long for a production environment in which an OPC application time of 8 seconds or less is desired. The material waste also increases the manufacturing cost of the CRT. A similar drawback is encountered when the OPC layer is air-sprayed onto the interior surface of the faceplate panel, using a conventional spraying apparatus. In addition, conventional air-spraying requires a multiplicity of passes across the interior surface to deposit an OPC layer having a thickness of 5–6 μm, and large droplets of OPC material frequently are deposited onto the underlying OC layer, causing surface irregularities in the photoreceptor. These surface irregularities cause non-uniform electrostatic charging of the photoreceptor and corresponding non-uniformities in the luminescent screen. Electrostatic-spraying of the OPC solution to form the OPC layer is preferred, because it has none of the drawbacks of spin-coating or air-spraying and provides a substantially uniform OPC layer in about 8 seconds or less.

Regardless of the method of application of the OPC solution, it is necessary to determine, quickly and accurately, the actual thickness of the entire OPC layer, because its thickness is a critical process parameter in the manufacturing of a screen by the EPS process. OPC layer thickness determines the amount of corona charge that the layer can hold. If the OPC layer is too thin, not enough charge can be held to produce phosphor lines or dots of acceptable quality. If the layer is too thick, the high temperature bakeout step becomes more critical because of the excessive amount of organic material that must be removed from the screen prior to final tube assembly. Excessive OPC thickness also wastes valuable process index time during the application of the excess material.

SUMMARY OF THE INVENTION

The invention relates to a method for determining the thickness of a layer that is strongly absorptive to light at a first wavelength and substantially transmissive to light at a second wavelength. According to the method, the layer is illuminated with light and the light transmitted through the layer is incident on a first filter that is transmissive to light of the first wavelength. A first light intensity pattern transmitted through the first filter is sensed and stored in a first memory frame. Then, the layer is illuminated again with light and the light transmitted through the layer is incident on a second filter transmissive to light of the second wavelength. A second light intensity pattern transmitted through the second filter is sensed and stored in a second memory frame. A ratio of the first light intensity pattern and the second light intensity pattern is determined and utilized to calculate the thickness of the layer. An apparatus for practicing the method also is disclosed.

BRIEF DESCRIPTION OF THE DRAWINGS

The invention will now be described in greater detail, with relation to the accompanying drawings, in which:

FIG. 3 is a graph of the spectral transmission of two OPC layers of different thickness with the spectral transmission of a Kodak™ No. 36 blue filter superposed thereon;

FIG. 4 is a graph of the blue and red filter transmission responses versus wavelength for three different OPC layer thicknesses;

DETAILED DESCRIPTION OF THE PREFERRED EMBODIMENTS

Figure 1:
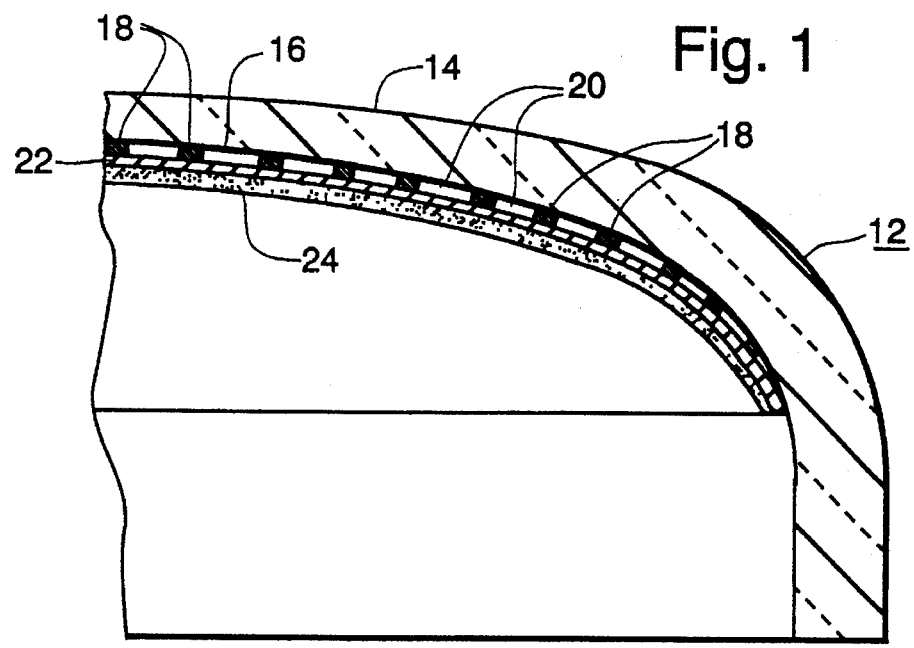
FIG. 1 shows a section of a faceplate panel for a CRT having an OPC layer on an interior surface thereof.

As shown in FIG. 1, a faceplate panel 12 of a CRT includes a viewing faceplate 14 having an interior surface 16 that may include a light absorbing matrix 18 having a plurality of openings 20 therethrough. In the manufacturing of a luminescent screen by the EPS method, the faceplate panel 12 has a thin, transparent, organic conductive (OC) layer 22 provided on the interior surface 16, or on the matrix 18, if included. A volatilizable, transparent, organic photoconductive (OPC) layer 24 overlies the OC layer 22. The OC layer 22 is described in U.S. Pat. No. 5,407,765, issued to Collins et al., on Apr. 18, 1995, and, preferably, is formed by spraying a solution, comprising a polyelectrolyte selected from the group consisting of poly(dimethyl-diallyl-ammonium chloride) and a copolymer of vinylimidazolium methosulfate and vinylpyrrolidone, and at least one of polyvinyl pyrrolidone, ethyl alcohol, methyl alcohol, and water, onto the matrix 18, which is formed by conventional means. The OPC layer 24 is formed by electrostatically spraying an organic photoconductive solution of polystyrene resin; 1,4-di(2,4-methylphenyl)-1,4 diphenyl butatriene (2,4-DMPBT) as an electron donor material; 2,4,7-trinitro-9-fluorenone (TNF) and 2-ethylanthroquinone (2-EAQ) as electron acceptor materials; a surfactant; and a suitable solvent, such as toluene or xylene. The OPC solution is more fully described in U.S. Pat. No. 5,413,885, issued to Datta et al., on May 9, 1995.

To facilitate production of luminescent screens by the EPS process, it is desirable that the OPC layer 24 have an optimized thickness within the range of 3.5 to 8 μm, and, preferably, within the range of 5–6 μm. It also is desirable to measure the thickness of the layer 24 immediately after the OPC solution dries, and this measurement should be made without disrupting the production of screens. This can be accomplished by including in the manufacturing line an apparatus 28 for determining the thickness of each OPC layer.

Figure 2:
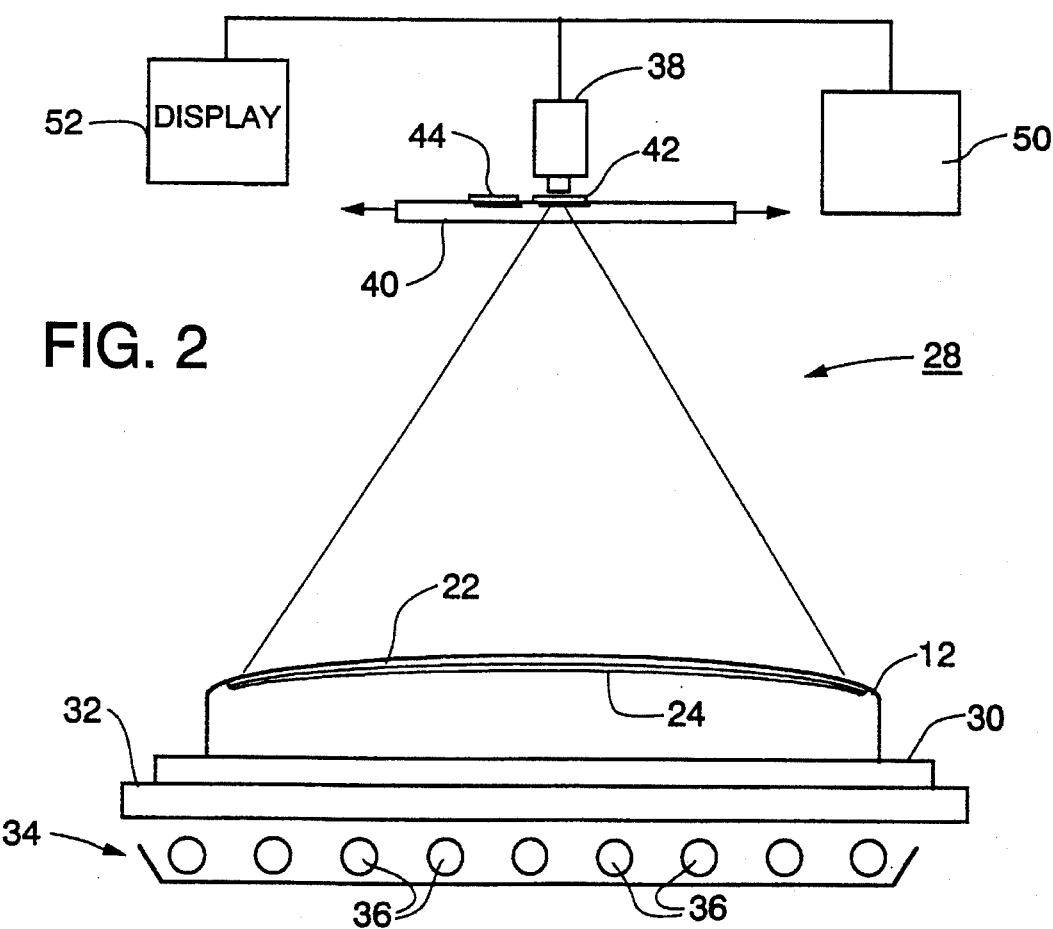
FIG. 2 is a schematic diagram of an OPC layer thickness measuring apparatus.

The apparatus 28 is shown in FIG. 2 and includes a transparent, protective support plate 30 made of a clear acrylic resin sheet, such as PLEXIGLAS™, available from Rohm & Haas, Philadelphia, Pa., or an equivalent material, which overlies a diffuser 32. The diffuser is white and is made by etching a glass plate with a suitable acid, or by mechanically abrading the surface of the glass plate, to diffuse the light incident thereon without absorbing any of the light. Positioned below the diffuser 32 is an array 34 of fluorescent lamps 36 that provides visible light having a prominent 436 nm line. A light sensor, such as a CCD camera, 38 is positioned about 0.5 to 1 meter above the protective plate 30. The CCD camera 38 is conventional and includes three channels, a "blue," a "green" and a "red" channel that additively produce all the colors of the visible spectrum. The camera includes means for separating the light incident on the camera into the three basic colors and directing each color to a separate channel containing a CCD chip. Each CCD chip includes a rectangular array of 640× 480 pixels on which a light intensity pattern is registered. The 436 nm line of the array 34 of fluorescent lamps 36 enhances the blue channel sensitivity of the CCD camera 38 to variations in the thickness of the OPC layer. A filter holder 40, that contains a first filter 42, e.g., a red filter, and a second filter 44, e.g., a blue filter, is disposed directly in front of the camera 38.

Variations in the output of the array 34 of fluorescent lamps 36 would result in errors in the OPC thickness measurement. Accordingly, an initial calibration procedure is utilized to compensate for any variations in the operation of the array. In order to calibrate the apparatus 28, the red filter 42, that is transmissive to light above about 540 nm, is disposed in the filter holder 40. A neutral density filter, not shown, also is disposed within the filter holder, in the red optical path, for a purpose described hereinafter. Light from the array 34 of fluorescent lamps 36 passes through the diffuser 32 and the support plate 30 and is incident on the red filter 42. The faceplate panel 12 is not positioned on the support plate 30 during calibration of the apparatus, thus, the neutral density filter is required in order that the full dynamic range of the camera system may be utilized. A neutral density filter of appropriate absorption is selected to adjust the light levels incident on the camera, without the faceplate present, to those levels that will be incident on the camera when the faceplate is present. The image field of the diffuser 32 is transmitted through the red filter 42 and the first neutral density filter, and enters the CCD camera 38 where it is directed to the "red" channel and stored in the memory of a computer 50 as the initial red channel reference frame. Then, the blue filter 44, that also is disposed within the filter holder 40, is positioned in front of the CCD camera 38, so that light from the array 34, which passes through the diffuser 32 and the support plate 30, is incident thereon. A second neutral density filter, of appropriate absorption, (also not shown) is positioned in the blue optical path. The neutral density filter used with the blue filter 44 must have more attenuation than the neutral density used with the red filter 42, because the OPC layer, which is not present during this initial calibration, absorbs more strongly in the blue region of the spectrum than in the red region. The blue filter 44 has a peak transmission near 436 nm and a rapid cut-off within the range of 450–460 nm. One such filter is a No. 36 blue filter, available from Kodak, Corp., Rochester, N.Y. The image field of the diffuser 32, without the faceplate panel positioned on the support plate 30, is transmitted through the blue filter 44 and the second neutral density filter, and is stored in the memory of the computer 50 as the initial blue channel reference frame.

Because the computed OPC thickness determination is very sensitive to the red-to-blue intensity ratio, (r/b), it is necessary to accommodate variations due to changes in the light source and/or filters. The red-to-blue ratio of a cold fluorescent bulb is different than that of a warm or hot bulb, due to changes in phosphor efficiency with temperature. Accordingly, the color ratio will also vary with location along the length of the bulb. Additionally, the color characteristics of the filters may change with exposure to light, or to airborne organic chemicals.

To accommodate these variations and changes, a periodic calibration is performed on the apparatus 28, without a faceplate panel, viewing the light source 36 and diffuser 32, through the red filter 42, with the first neutral density filter, and through the blue filter 44, with the second neutral density filter. This periodic calibration produces a correction factor, or constant, as a function of location, pixel-by-pixel, on the image. The procedure for this periodic calibration, with the faceplate panel 12 removed from the apparatus 28, is as follows:

a) The red filter 42 and the appropriate neutral density filter (not shown), which are the same filters as used in the initial calibration, are placed in front of the CCD camera 38;

b) Light is incident on the red filter 42 and on the neutral density filter, and the resultant light intensity pattern is imaged in the "red" memory frame;

c) The blue filter 44 and the appropriate neutral density filter (also not shown), which are the same filters as used in the initial calibration, are placed in front of the CCD camera 38;

d) Then, light is incident on the blue filter 44 and on the neutral density filter, and the resultant light intensity pattern is imaged in the "blue" memory frame;

e) The red-to-blue light intensity pattern ratio, for the periodic calibration, is divided, pixel-by-pixel, and the image is stored in page one of the "green" memory channel, $G_1$; and f) The initial calibration of the red-to-blue light intensity pattern ratio of the light source and diffuser, without the faceplate panel, is recalled and stored in page two of the "green" memory channel, $G_2$.

The faceplate panel 12 with the OC and OPC layers 22 and 24, respectively, deposited on the interior surface thereof, is measured to determine the thickness of the OPC layer 24. A suitably coated faceplate panel 12 is positioned on the protective support plate 30 of the apparatus 28. Light from the array 34 is transmitted through the OPC layer 24, on the interior of the faceplate panel 12, and is incident on the first filter 42, i.e., the "red" filter, that is disposed in the filter holder 40. A first light intensity pattern of the illumination transmitted through OPC layer 24 and the red filter 42 is imaged on the pixels of the CCD camera 38 in the red channel, and stored in a first page of the "red" memory frame, $R_1$. Then, the second filter 44, i.e., the "blue" filter, is disposed in the holder 40, in front of the CCD camera 38. A second light intensity pattern of the illumination transmitted through the OPC layer 24 and the blue filter 44 is imaged on the pixels of the CCD camera 38, in the blue channel, and stored in a first page of the blue memory frame, $B_1$.

An r/b ratio, expressed as:

$$r/b = R_1/B_1 \times G_2/G_1 \quad (1)$$

may be utilized hereinafter, in equations (3) and (6), to obtain the properly calibrated OPC screen weight distributions, taking into consideration the periodic calibration of the light source and the filters.

As shown in FIG. 3, the spectral transmission of the OPC layer 24 is substantially zero below 420 nm and increases rapidly with wavelength, so that in the region of 450 to 460 nm, the OPC layer absorption edge coincides with the fall-off of the Kodak™ No. 36 blue filter. Note that the spectral transmission of the OPC layer 24 is dependent on the thickness of the OPC layer. For example, curve 1 represents an OPC layer having a thickness of 2.24 μm, and the transmission of this layer intercepts the fall-off of the Kodak™ No. 36 blue filter, curve 3, at about 435 nm; whereas curve 2 represents an OPC layer having a thickness of about 3.44 μm, and the transmission of this thicker OPC layer intercepts the fall-off of the Kodak™ No. 36 blue filter, curve 3, at about 440 nm. The intersecting curves 1 and 3, and 2 and 3, define substantially triangular areas of different size, so the area under each set of curves is indicative of the thickness of each of the OPC layers. The substantially triangular areas under the intersecting curves are referred to as "product curves" and are shown in FIG. 4 for three different OPC layer thicknesses. Clearly the areas under the product curves made with the Kodak™ No. 36 blue filter and the leading edge of the OPC layer are quite sensitive to OPC layer thickness, while the areas under the curves made using the red filter are substantially equal for the three different thicknesses utilized.

The OPC layer thickness also can be determined by using the interference maxima in the spectral transmission curves, shown in FIG. 3, for the OPC layer. The formula for determining the thickness of the OPC layer by this method is:

$$t_{OPC} = N\lambda_1/(2n) \quad (2),$$

where $N = \lambda_2/(\lambda_2 - \lambda_1)$, and n, the index of refraction of the OPC layer, is 1.60. For curve 2, $\lambda_1 = 483$ nm and $\lambda_2 = 505$ nm. Using these wavelength values for $\lambda_1$ and $\lambda_2$, the thickness of the OPC layer is calculated to be about 3.44 μm. The wavelengths $\lambda_1$ and $\lambda_2$ are consecutive maxima in the small amplitude oscillations in the transmission curve 2 that occur in the longer wavelength region where the OPC layer does not absorb any significant amount of light from the array 34. The method of utilizing consecutive maxima to determine OPC layer thickness is very accurate; however, it is an impractical method for "on line" thickness determination because the procedure requires spectral transmission curves for each layer, and these curves require the use of a spectrophotometer. However, this procedure may be utilized to verify the results achieved with the apparatus 28 of FIG. 2, described above. In the TABLE below, the parameters associated with nine OPC layer samples, with thicknesses ranging from about 3 μm to about 7 μm, are listed. The samples were obtained from faceplate panels coated with an OC layer 22 and an OPC layer 24. The OC layer 22 is of constant thickness and it is uniformly transmissive across the visible spectrum. Variations in glass transmission, due to changes in panel thickness across the viewing surface, and in the size of the matrix opening at different positions on the panel, do not affect the red-to-blue ratio, because both the red and blue wavelengths are similarly absorbed in any given region of the faceplate panel. Therefore, any variation in the red-to-blue pixel signal transmission ratio through the faceplate panel is a function of only the OPC layer 24. Utilizing the apparatus of FIG. 2, the red-to-blue pixel signal transmission ratios were read in all sample areas, and the OPC layer weight, in mg/cm², can be expressed by the relationship, according to the regression analysis, as $$w_{OPC} = 0.1475 + 0.2374(r/b)^{1/2} \quad (3).$$

To verify the thickness measurements obtained using the present apparatus and the novel method, the sample areas that were tested to determine the red-to-blue transmission signal ratios were removed by scraping the OC layer 22 and the OPC layer 24, weighing the scraped samples and comparing the weight with the OPC layer weight determined using equation 3. The weight of the constant thickness OC layer 22 in these experiments was pre-determined by first preparing OC only coatings, and subsequently removing, by scraping, and weighing the OC material that was removed. To generate the OPC mg/cm² readings in the TABLE, the pre-determined OC weight was subtracted from the combined weight of the scraped OC and OPC layers. The weight in mg/cm² can be expressed as an equivalent thickness, in μm by the following conversion factor:

$$t_{OPC} = [w_{OPC}/\text{density}] \times 10^4 \ \mu m/cm \quad (4).$$

The density of the OPC layer is 1000 mg/cm³, thus, equation (4) can be rewritten as:

$$t_{OPC} w_{OPC} \times 10 \ \mu m \quad (5).$$

TABLE

| Sample Number | Sample Scraped OPC mg/cm² | r/b pixel signal ratio | $(r/b)^{1/2}$ | Equation (3) Regression Approx. to mg/cm² | Equivalent Thickness μm |
|---|---|---|---|---|---|
| 1 | 0.28 | 0.359 | 0.559 | 0.29 | 2.9 |
| 2 | 0.38 | 0.882 | 0.939 | 0.37 | 3.7 |
| 3 | 0.43 | 1.141 | 1.068 | 0.401 | 4.01 |
| 4 | 0.46 | 1.518 | 1.232 | 0.44 | 4.4 |
| 5 | 0.48 | 2.292 | 1.514 | 0.507 | 5.07 |
| 6 | 0.49 | 2.421 | 1.556 | 0.517 | 5.17 |

TABLE-continued

| | | OPC THICKNESS | | | |
|---|---|---|---|---|---|
| Sample Number | Sample Scraped OPC mg/cm² | r/b pixel signal ratio | (r/b)^{1/2} | Equation (3) Regression Approx. to mg/cm² | Equivalent Thickness μm |
| 7 | 0.53 | 2.427 | 1.558 | 0.517 | 5.17 |
| 8 | 0.55 | 3.24 | 1.8 | 0.575 | 5.75 |
| 9 | 0.69 | 4.726 | 2.174 | 0.664 | 6.64 |

Figure 5:
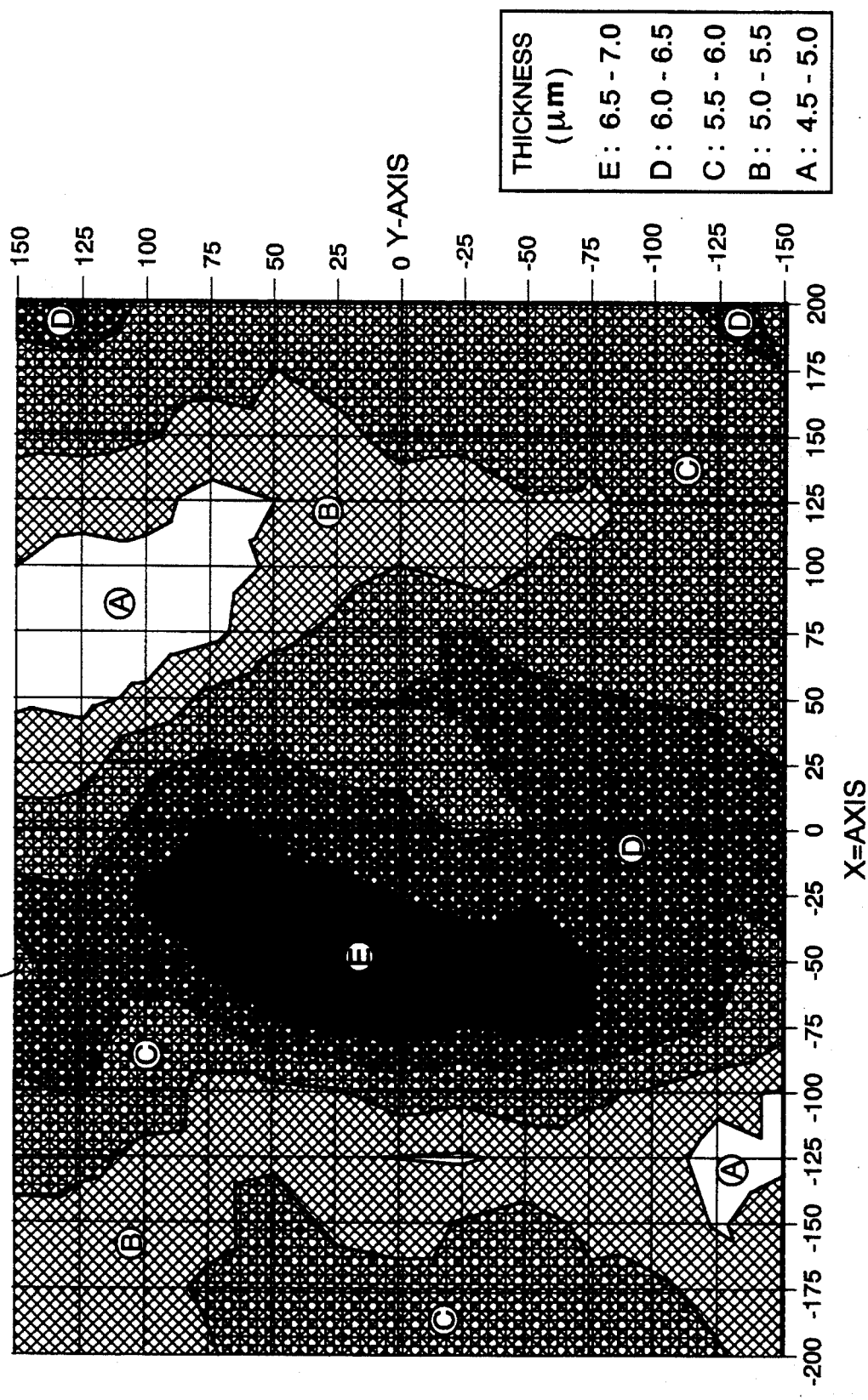
FIG. 5 is a contour map of the thickness of an OPC layer based on the ratio of red and blue light transmission through the layer.

As described above, after the apparatus 28 is calibrated, a faceplate panel 12 having an OC layer 22 and an OPC layer 24 thereon is placed on the support plate 30 and illuminated by the array 34. The red filter 42 is placed before the CCD camera 38, and the first light intensity pattern of the illumination, transmitted through OPC layer and the red filter, is imaged on the pixels of the CCD in the red channel and stored in the first memory frame. Then, the blue filter 44 is placed before the CCD camera, and a second light intensity pattern of the illumination, transmitted through the OPC layer and the blue filter, is imaged on the pixels of the CCD in the blue channel and stored in the second memory frame. The computer 50 applies equation (3) to the data stored in the red memory frame and in the blue memory frame, pixel by pixel, to provide a contour plot of the relative thickness of the OPC layer. The contour plot is presented on a display 52 which may comprise a monitor and/or a printer. Such a contour plot of the OPC layer 24 is shown in FIG. 5 for a faceplate panel 12 having a diagonal dimension of 51 cm. As shown in FIG. 5, the thickness of the OPC layer 24 ranges form 4.5 μm to about 7.0 μm, and is within the acceptable thickness range. This measurement can be made rapidly and "on line," and has a high degree of accuracy, because the CCD camera images the entire OPC layer.

It has been determined that for an OPC thickness ranging below 0.3 mg/cm² and above 0.6 mg/cm², equation (3) becomes inaccurate; however, a more accurate equation can be expressed as $$w_{OPC} = Ax^2 + Bx + C \quad (6),$$

where

A=−0.643,

B=+1.66,

C=−0.375 and $x = (r/b)^{1/2}$

Figure 6:
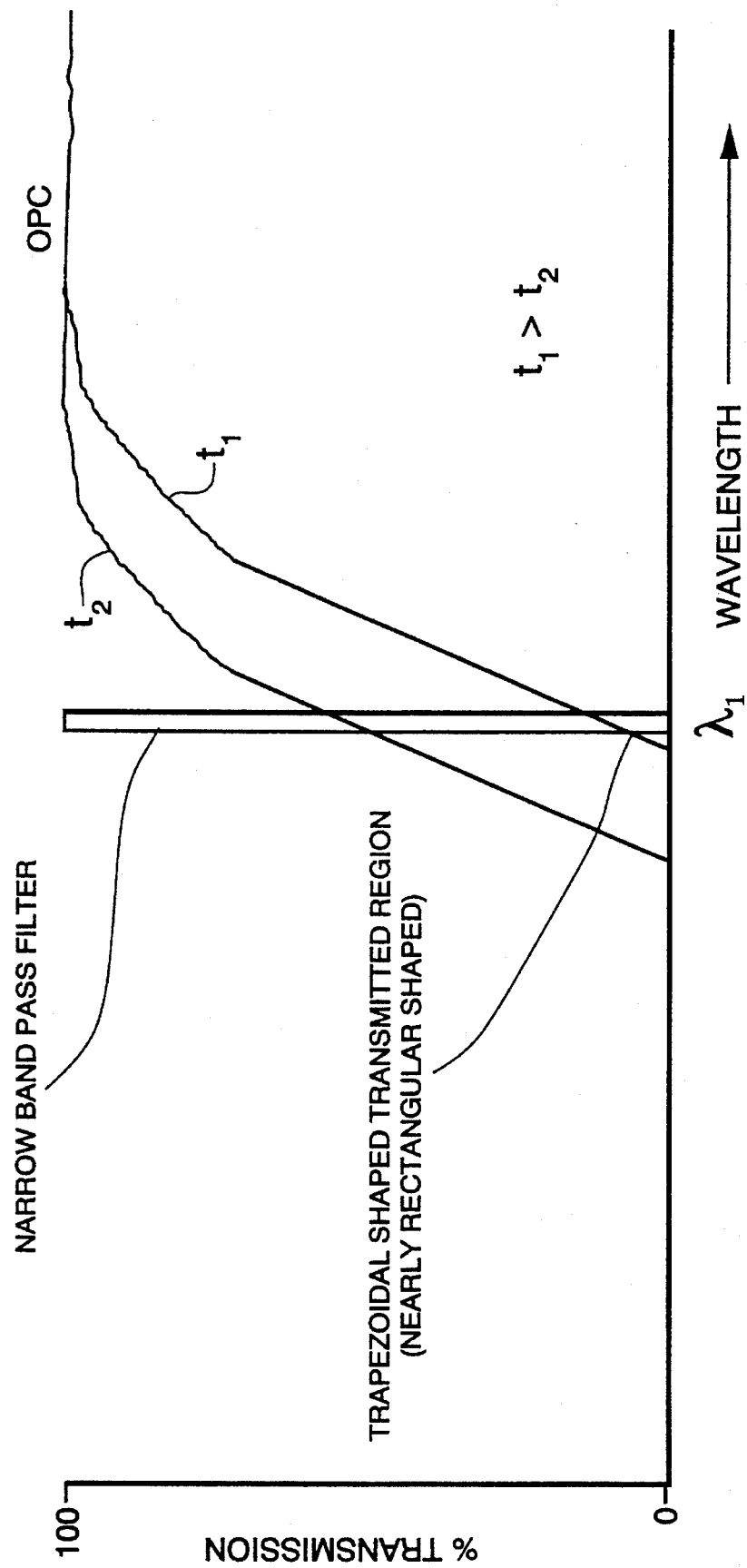
FIG. 6 is a graph of the spectral transmission of two OPC layers of different thickness with the spectral transmission of a narrow bandpass filter superposed thereon.

Yet another embodiment of the present invention utilizes a narrow bandpass filter, such as an interference filter, rather than the relatively broad bandpass Kodak™ No. 36 blue filter. As shown in FIG. 6, the narrow bandpass filter is superposed over a portion of the OPC layer absorption edge, so that the shape of the area under the absorption edge of the OPC layer and within the narrow bandpass filter is trapezoidal, or substantially rectangular. The curves $t_1$ and $t_2$ refer to two different OPC layers having different thicknesses, and the thickness of the layer $t_1$ is greater than the thickness of the layer $t_2$. If a rectangularly shaped, very narrow bandpass region is assumed, then the OPC thickness will more closely approximate a function, such as the following simplified expression, that is exact for an infinitely narrow bandpass filter:

$$t_{OPC} = -\ln T/C \quad (7)$$

where T is the transmission and C is experimentally determined and is expressed in μm⁻¹.

What is claimed is:

1. A method for determining the thickness of a transparent layer that is strongly absorptive to visible light at a first wavelength and substantially transmissive to visible light at a second wavelength, said transparent layer overlying a transparent substrate, said method includes the steps of:

a) illuminating said transparent layer and said transparent substrate with a light, said light transmitted through said layer and said substrate being incident on a first filter transmissive to light of said first wavelength;

b) sensing a first light intensity pattern transmitted through said first filter;

c) storing said first light intensity pattern in a first memory frame;

d) illuminating said transparent layer and said transparent substrate with said light, said light transmitted through said layer and said substrate being incident on a second filter transmissive to light of said second wavelength, e) sensing a second light intensity pattern transmitted through said second filter;

f) storing said second light intensity pattern in a second memory frame;

g) determining a ratio of said first light intensity pattern and said second light intensity pattern; and h) utilizing said ratio to calculate the thickness of said transparent layer.

2. The method as described in claim 1, wherein prior to step a), performing the additional step of calibrating a light to be used for illuminating said layer.

3. The method as described in claim 1, wherein said transparent substrate comprises an OC layer disposed on an interior surface of a CRT faceplate panel and said transparent layer comprises an OPC layer overlying said OC layer.

4. The method as described in claim 3, wherein said first wavelength is above about 460 nm.

5. The method as described in claim 3, wherein said second wavelength is within the range of 400 to 450 nm.

6. The method as described in claim 1, wherein said first light intensity pattern is sensed with a first channel of a CCD camera and said second light intensity pattern is sensed with a second channel of said CCD camera.

7. The method as described in claim 1, wherein step g), determining the ratio of said first light intensity pattern and said second light intensity pattern, includes dividing said first memory frame by said second memory frame.

8. A method for determining the thickness of an OPC layer deposited on an interior surface of a faceplate panel, said OPC layer being substantially transmissive red light and strongly absorptive of blue light, said method includes the steps of:

calibrating a light source to be used in the determination of the thickness of said OPC layer;

illuminating said OPC layer with white light from said light source, said light transmitted through said OPC layer being incident on a first filter transmissive to red light;

sensing a first light intensity pattern for the red light transmitted through said first filter with a first CCD having an array of pixels;

storing said first light intensity pattern transmitted in a first memory frame;

illuminating said layer with white light from said light source, said light transmitted through said OPC layer being incident on a second filter transmissive to blue light;

sensing a second light intensity pattern for the blue light transmitted through said second filter with a second CCD having an array of pixels;

storing said second light intensity pattern in a second memory frame;

applying said first memory frame and said second memory frame, pixel by pixel, to determining a red-to-blue intensity ratio for each pixel; and utilizing said red-to-blue intensity ratio to calculate the thickness of said OPC layer.

9. An apparatus for determining the thickness of a transparent layer disposed on an interior surface of a transparent workpiece, said apparatus including:

a support plate for supporting said workpiece;

an array of lamps for providing illumination for said layer;

a diffuser disposed between said array of lamps and said support plate;

a first filter transmissive to light of a first wavelength and a second filter transmissive to light of a second wavelength, each of said filters being disposed adjacent to a light sensor that serially senses a first and a second light intensity pattern transmitted through said first and said second filters, respectively;

a first frame memory for storing said first light intensity pattern;

a second frame memory for storing said second light intensity pattern; and means for dividing said first memory frame by said second memory frame to determine a ratio of said first and second light intensity patterns and for calculating the thickness of said layer.

10. The apparatus as described in claim 9, wherein said array of lamps comprises fluorescent lamps providing visible light and having a prominent 436 nm line.

11. The apparatus as described in claim 9, wherein said light sensor comprises a CCD camera having a first channel for sensing said first light intensity pattern and a second channel for sensing said second light intensity pattern.

12. The apparatus as described in claim 9, wherein said means for dividing and for calculating comprises a computer.

13. The apparatus as described in claim 9, further including display means for displaying a contour plot of the thickness of said layer.

14. The apparatus as described in claim 13, wherein said display means is selected from the group consisting of a color monitor and a color printer.

* * * * *